US005757156A

United States Patent [19]

Sasajima

[11] Patent Number: 5,757,156

[45] Date of Patent: May 26, 1998

[54] OPENING/CLOSING DEVICE FOR AUTOMOBILE DOOR

[75] Inventor: Kouji Sasajima, Wako, Japan

[73] Assignee: Honda Giken Kogyo Kabushiki Kaisha, Tokyo, Japan

[21] Appl. No.: 857,060

[22] Filed: May 15, 1997

[30] Foreign Application Priority Data

Jun. 12, 1996 [JP] Japan .................................... 8-151361

[51] Int. Cl.[6] ........................................................ B60J 5/04

[52] U.S. Cl. ................................ 318/456; 318/463; 318/1

[58] Field of Search .................................... 318/1, 2, 566, 318/626, 628, 264, 265, 266, 272, 286, 456, 461, 463, 464, 466, 467, 468

[56] References Cited

U.S. PATENT DOCUMENTS 5,653,056 8/1997 Stark .......................................... 49/43

FOREIGN PATENT DOCUMENTS

3500062A1 7/1986 Germany .
03-250181 2/1992 Japan .
4-285282 A 10/1992 Japan .
06328940 A 11/1994 Japan .

*Primary Examiner*—Bentsu Ro
*Attorney, Agent, or Firm*—Merchant, Gould, Smith, Edell, Welter & Schmidt, P.A.

[57] ABSTRACT

An opening/closing device for an automobile door comprising a speed sensor for detecting a moving speed of a door, a motor for applying an opening/closing assisting force to the door, and a control unit for controlling the driving of the motor, is provided. The control unit includes an acceleration computing unit for differentiating speed signals supplied from the speed sensor to compute accelerations and output acceleration signals and a control variable setting unit for setting control variables of the motor based on acceleration signals from the acceleration computing unit. Thereby, even if a torque sensor for detecting the operating force of a person operating the door is omitted, it is possible to generate control variables corresponding to acceleration signals which are equivalent to control variables corresponding to torque to drive the motor.

5 Claims, 7 Drawing Sheets

OPENING/CLOSING DEVICE FOR AUTOMOBILE DOOR

BACKGROUND OF THE INVENTION

1. Field of the Invention

The present invention relates to an opening/closing device for an automobile door and, in particular, to an opening/closing device for an automobile door which, when opening and closing a sliding door which is slidably attached to an opening in the automobile body, applies the assisting force of a motor to the sliding door in accordance with the force exercised by the person operating the door, to perform spontaneous and natural opening and closing of the door.

2. Description of the Related Art

A "Vehicle Door Opening/Closing Device" disclosed in Japanese Patent Laid-Open Publication No. HEI 6-328940 comprises an operating force detection means for detecting the opening and closing operating force of the door, a speed detection means for detecting the opening and closing speed of the door, a sensor such as a door position detection means for detecting the opening and closing positions of the door or the like, and a control unit, and is constructed such that the operating force detection means detects the opening/closing operating force which a person applies to the door and an assisting force is adjusted according to the detected opening/closing operating force. Further, the above "Vehicle Door Opening/Closing Device" is constructed such that the speed detection means detects the door opening/closing speed and adjusts the assisting force according to the opening/closing speed, and upon the door position detection means detecting a predetermined position of the door, the assisting force is increased.

A "Vehicle Door Opening/Closing Force Assisting Device" disclosed in Japanese Patent Laid-Open Publication No. HEI 4-285282 is constructed such that, as well as detecting commencement of the opening/closing operation of a door by means of a photocoupler and controlling the application of a voltage to a motor by means of a controller, it detects the door speed from a current value flowing into the motor and controls the voltage being applied to the motor so that the door speed is within a predetermined range.

The "Vehicle Door Opening/Closing Device" disclosed in Japanese Patent Laid-Open Publication No. HEI 6-328940, in order to provide the operating force detection means (e.g. a torque sensor), for detecting the opening/closing operating force of the person operating the door, in the knob or the like of the door which is a movable section, has the problem that structure becomes complex due to the necessity for a moveable type cable for connecting the operating force detection means and the control means and protection etc. with regard to bending of the cable, meaning that expensive components are necessary and the production cost is high.

Also, the "Vehicle Door Opening/Closing Force Assisting Device" disclosed in Japanese Patent Laid-Open Publication No. HEI 4-285282 has a structure wherein an applied voltage (control amount) to the motor is controlled by detecting commencement of door operation from the motor revolutions and detecting the door speed from a current value flowing into the motor. As a result, although an operating force detection means (e.g. a torque sensor) is unnecessary and the problems of a moveable type cable and protection etc. with regard to bending of the cable are eliminated, because as described above the "Vehicle Door Opening/Closing Force Assisting Device" detects the door speed corresponding to a current value flowing in the motor and controls the applied voltage so that the door speed is within a predetermined range, an assisting force corresponding to the operating force which a person actually applies to the door knob in order to open/close the door cannot be attained and opening and closing of the door is unnatural, not matching the sensitivity of the person operating the door.

SUMMARY OF THE INVENTION

According to the present invention, an opening/closing device for an automobile door is provided which comprises a speed sensor for detecting the moving speed of a door, a motor for applying an opening/closing assisting force to the door, and a control unit for controlling driving of the motor, wherein the control unit includes an acceleration computing unit for differentiating speed signals supplied from the speed sensor to compute accelerations and output acceleration signals, and a control variable setting unit for setting control variables of the motor based on the acceleration signals from the acceleration computing unit. Accordingly, even if a torque sensor for detecting the operating force of the person operating the door is omitted, control variables corresponding to acceleration signals which are equivalent to control variables corresponding to torque can be produced to drive the motor.

In a preferred form, the control variable setting unit includes a control variable memory which stores the control variables corresponding to the acceleration signals so that the motor can be driven in accordance with the control variables corresponding to instantaneous values of acceleration.

As another preferred form of the control variable setting unit, an average value computing unit for computing average values of predetermined time periods of the acceleration signals, and a control variable memory for storing control variables corresponding to average acceleration signals from the average value computing unit, are provided. Accordingly, it is possible to drive the motor by means of control variables of predetermined patterns corresponding to average acceleration values.

As yet another preferred form of the control variable setting unit, a pattern recognition unit for recognizing patterns in the acceleration signals, and an evaluation unit for evaluating the operating force of the person operating the door by means of patterns from the pattern recognition unit and outputting control variables based on evaluation results, are provided. Thereby, the motor can be driven by control variables corresponding to the operating force of the person operating the door.

As still another preferred form of the control variable setting unit, a differential computing unit for differentiating a motor current signal detected by a motor current detector and outputting a differentiated current signal, a conversion unit for making the differentiated current signals correspond to the acceleration signals, a subtraction unit for computing deviations between acceleration signals and output signals from the conversion unit, and a control variable memory for storing control variables corresponding to deviations from the subtracting unit, are provided. Thereby, acceleration signals can be separated into the assisting force component of the motor and the operating force component of the person operating the door, and it is possible to drive the motor by means of control variables corresponding to the operating force component of the person.

BRIEF DESCRIPTION OF THE DRAWINGS

These and other features, aspects and advantages of the present invention will become better understood with reference to the following description, appended claims and accompanying drawings, wherein:

DETAILED DESCRIPTION OF THE INVENTION

The present invention, as well as performing setting of control variables of the motor based on door acceleration signals corresponding to the revolutions of the motor in place of torque signals from a torque sensor, can make control variables based on the above acceleration signals approximate to control variables based on the above torque signals.

Figure 1:
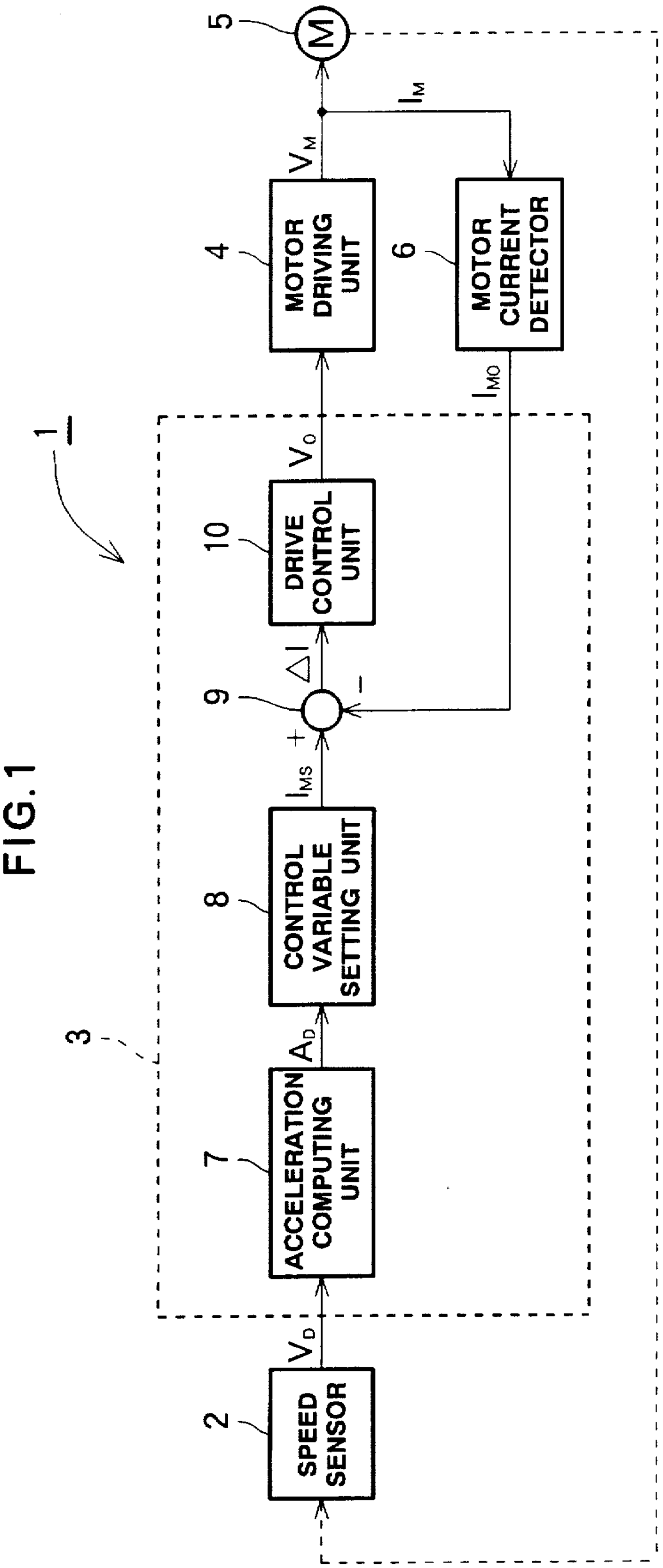
FIG. 1 is a basic block diagram of the opening/closing device for an automobile door according to the present invention.

Also, the present invention, when generating control signals for controlling the driving of the motor, instead of using a torque sensor for detecting the operating force of the person operating the door, uses a speed sensor to detect the speed at which the door moves when the person first applies force and moves the door, computes an acceleration from this speed and sets a control variable corresponding to the acceleration to drive the motor, and applies assisting force to the door, the control variable being set in consideration of the polarity of the acceleration. In FIG. 1, the opening/closing device 1 of the automobile door comprises the speed sensor 2, a control unit 3, a motor driving unit 4, a motor 5, and a motor current detector 6.

The speed sensor 2 is attached coaxially with the axis of rotation of the motor 5 and comprises an encoder, tachometer generator or the like for example, and a pulse output from the encoder or electrical output generated by the tachometer generator, corresponding to the revolutions of the motor 5, is supplied to the control unit 3 as a speed signal $V_D$.

The control unit 3 is formed by various computing units, processing units, a PWM signal generating unit, memories etc., with a microprocessor as a base, and has an acceleration computing unit 7, a control variable setting unit 8, a deviation computing unit 9 and a drive control unit 10. The control unit 3 differentiates a speed signal $V_D$ detected by the speed sensor 2 to generate an acceleration signal $A_D$, outputs a PWM (pulse width modulation) control signal $V_0$ based on a deviation signal ΔI between a previously set control variable $I_{MS}$ (target current signal $I_{MS}$) corresponding to the acceleration signal $A_D$ and a motor current signal $I_{MO}$ detected by the motor current detector 6, and controls the driving of the motor 5 via the motor driving unit 4.

The acceleration computing unit 7 includes either a differential computing unit or a software-controlled differential computing function, converts the speed signal $V_D$ (e.g. number of pulses) supplied from the speed sensor 2 to a digital value, subjects the digital value speed signal $V_D$ to differential computation ($dV_D/dt$) at a predetermined timing, and supplies an acceleration signal $A_D$ to the control variable setting unit 8.

The control variable setting unit 8 includes a memory such as a ROM or the like and an average value computing unit or comparator, reads the previously stored control variable (target current signal) $I_{MS}$ from the acceleration signal $A_D$ supplied from the acceleration computing unit 7, and supplies this control variable (target current signal) $I_{MS}$ to the deviation computing unit 9.

The control variable setting unit 8 stores control variable data ($I_{MS}$), corresponding to the acceleration signal $A_D$ which is experimentally obtained beforehand using a trial and error method, in a memory, and where the acceleration signal $A_D$ has been supplied, reads out the control variable data ($I_{MS}$) corresponding to the acceleration signal $A_D$ and outputs it as the control variable (target current signal) $I_{MS}$. The control variable setting unit 8 may also be constructed so that, as well as computing an average value of the acceleration signal $A_D$ at predetermined time intervals (average acceleration signal $A_{DAV}$ [illustrated in FIG. 3]), it stores in a memory control variable data ($I_{MS}$) corresponding to the average acceleration signal $A_{DAV}$ experimentally obtained beforehand using the trial and error method, reads out the control variable data ($I_{MS}$) corresponding to the computed average acceleration signal $A_{DAV}$, and outputs it as the control variable (target current signal) $I_{MS}$.

Further, the control variable setting unit 8 can also be constructed to recognize the pattern of the acceleration signal $A_D$, evaluate the pattern based on various parameters, read out previously set control variable data ($I_{MS}$) corresponding to the evaluation result, and output this as the control variable (target current signal) $I_{MS}$.

Further still, the control variable setting unit 8 can also be constructed comprising a differential computing unit for differentiating a motor current signal detected by a motor current detector and outputting a differentiated current signal, a conversion unit for making the differentiated current signal correspond to the acceleration signal, a subtraction unit for computing a deviation between the acceleration signal and an output signal from the conversion unit, and a control variable memory for storing a control variable corresponding to the deviation obtained from the subtracting unit. The differentiated current signal is converted to an output signal (converted signal) corresponding to the acceleration signal $A_D$, whereafter a deviation between the acceleration signal $A_D$ and the output signal (converted signal) is computed to attain a deviation signal, previously set control variable data ($I_{MS}$) corresponding to the deviation signal are read out and output as the control variable (target current signal) $I_{MS}$.

The deviation computing unit 9 has either a subtraction unit or a software-controlled subtraction function, computes a deviation ΔI ($=I_{MS}-I_{MO}$) between the control variable (target current signal) $I_{MS}$ supplied from the control variable setting unit 8 and the motor current signal $I_{MO}$ supplied from the motor current detector 6, and supplies a deviation signal ΔI to the drive control unit 10.

The drive control unit 10 comprises a PID (proportional integral and differential) controller, a PWM (pulse width modulation) control signal generating unit, etc., and after executing P (proportional) control, I (integral) control and D (differential) control on the deviation signal $\Delta I$ ($=I_{MS}-I_{MO}$) supplied from the deviation computing unit 9, supplies a PWM control signal $V_0$ corresponding to the deviation signal $\Delta I$ to the motor driving unit 4. Note that the drive control unit 10, in order to make the motor current signal $I_{MO}$ equal to the control variable (target current signal) $I_{MS}$, controls the deviation signal $\Delta I$ ($=I_{MS}-I_{MO}$) so that it quickly becomes 0 ($I_{MS}=I_{MO}$)

The motor driving unit 4 is constructed by, for example, a bridge circuit formed by four power field effect transistors (FETs), these power field effect transistors (FETs) being arranged in two groups of two on a diagonal line, one group being operated by an ON signal and a PWM signal and the other group being inhibited by an OFF signal. The motor driving unit 4 drives the motor 5 by means of a PWM pulse wave form motor voltage $V_M$, and circulates a motor current $I_M$ corresponding to the deviation signal $\Delta I$ in the motor 5.

The motor current detector 6 is constructed so that it detects the motor current $I_M$ circulating in the motor 5 and converts it into a corresponding digital motor current signal $I_{MO}$, and feeds the motor current signal $I_{MO}$ back to the deviation computing unit 9.

When the motor current signal $I_{MO}$ and the control variable (target current signal) $I_{MS}$ are equal ($I_{MO}=I_{MS}$) and the deviation signal $\Delta I$ is 0, the motor 5 is driven by the set motor current $I_M$.

Since the controller 1 of the automobile door opening/closing device of the present invention is provided with the acceleration computing unit 7 for differentiating the speed signal $V_D$ supplied from the speed sensor 2 to compute an acceleration and the control variable setting unit 8 for setting the control variable $I_{MS}$ of the motor 5 based on the acceleration signal $A_D$ from the acceleration computing unit 7, even if a torque sensor for detecting the operating force of a person operating the door is eliminated, control variables $I_{MS}$ corresponding to acceleration signals $A_D$ which are equivalent to control variables corresponding to torque can be generated to drive the motor 5.

Figure 2:
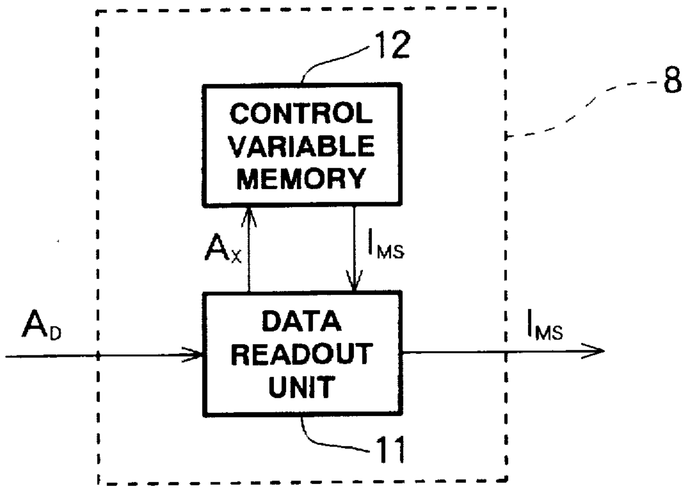
FIG. 2 is a block diagram showing an embodiment of the control variable setting unit.

FIG. 2 is a block diagram showing an embodiment of the control variable setting unit 8.

In FIG. 2, the control variable setting unit 8 comprises a data readout unit 11 and a control variable memory 12, and is constructed so that it reads out target current signal $I_{MS}$ data directly corresponding to the acceleration signal $A_D$ and outputs a target current signal $I_{MS}$.

The data readout unit 11 has an encoding function, and converts the acceleration signal $A_D$ to corresponding address data $A_X$, supplies the address data $A_X$ to the control variable memory 12 to read out the target current signal $I_{MS}$ data, then outputs the target current signal $I_{MS}$.

The control variable memory 12 is formed by a memory such as a ROM or the like, stores target current signal $I_{MS}$ data corresponding to instantaneous value acceleration signal $A_D$ data which is experimentally determined beforehand using a trial and error method, and once the address data $A_X$ is supplied, outputs the corresponding target current signal $I_{MS}$ data.

Note that setting of the target current signal $I_{MS}$ data creates different values according to the polarity (+ or −) and absolute values of the acceleration signal $A_D$.

Since the control variable setting unit 8 is provided in this way with the control variable memory 12 in which the control variable $I_{MS}$ corresponding to the acceleration signal $A_D$ has been stored, it can drive the motor 5 by means of control variables $I_{MS}$ corresponding to instantaneous values of acceleration.

Figure 3:
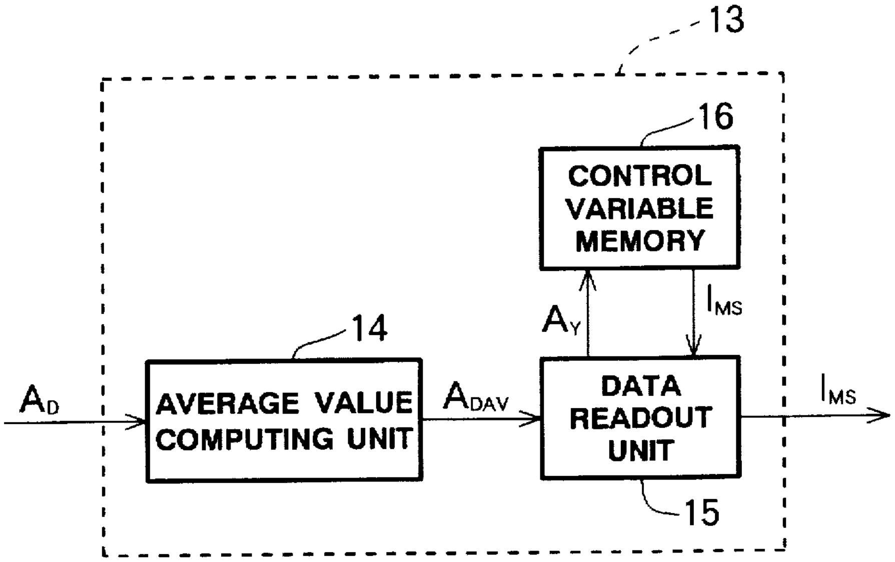
FIG. 3 is a block diagram showing another embodiment of the control variable setting unit.

FIG. 3 is a block diagram showing another embodiment of the control variable setting unit according to the present invention.

In FIG. 3, a control variable setting unit 13 comprises an average value computing unit 14, a data readout unit 15 and a control variable memory 16, and is constructed so that it reads out target current signal $I_{MS}$ data directly corresponding to an average acceleration signal $A_{DAV}$ which is an average value computed from the acceleration signal $A_D$ at predetermined intervals, and outputs a target current signal $I_{MS}$.

The average value computing unit 14 has a register, addition function and division function, temporarily stores the acceleration signal $A_D$ and adds it at every predetermined time interval T, executes division at the time intervals T to calculate an average acceleration $A_{DAV}$, and supplies the average acceleration signal $A_{DAV}$ to the data readout unit 15.

The data readout unit 15 has the same structure and operation as the data readout unit 11 shown in FIG. 2, converts the average acceleration signal $A_{DAV}$ to corresponding address data $A_Y$, supplies the address data $A_Y$ to the control variable memory 16 and reads out the target current signal $I_{MS}$ data, then outputs the target current signal $I_{MS}$.

The control variable memory 16 is formed by a memory such as a ROM or the like, stores target current signal $I_{MS}$ data corresponding to average acceleration signal $A_{DAV}$ data which comprises the average values of predetermined time intervals and is experimentally determined beforehand using the trial and error method, and once the address data $A_X$ is supplied, outputs the corresponding target current signal $I_{MS}$ data.

Note that setting of the target current signal $I_{MS}$ data creates different values according to the polarity (+ or −) and absolute values of the average acceleration signal $A_{DAV}$ data.

Since the control variable setting unit 13 comprises the average value computing unit 14 for computing average values of acceleration signals $A_D$ at predetermined intervals T, and the control variable memory 16 which has stored the control variable $I_{MS}$ corresponding to the average acceleration signal $A_{DAV}$ from the average value computing unit 14, it can drive the motor 5 by means of control variables $I_{MS}$ corresponding to average values $A_{DAV}$ of acceleration.

Figure 4:
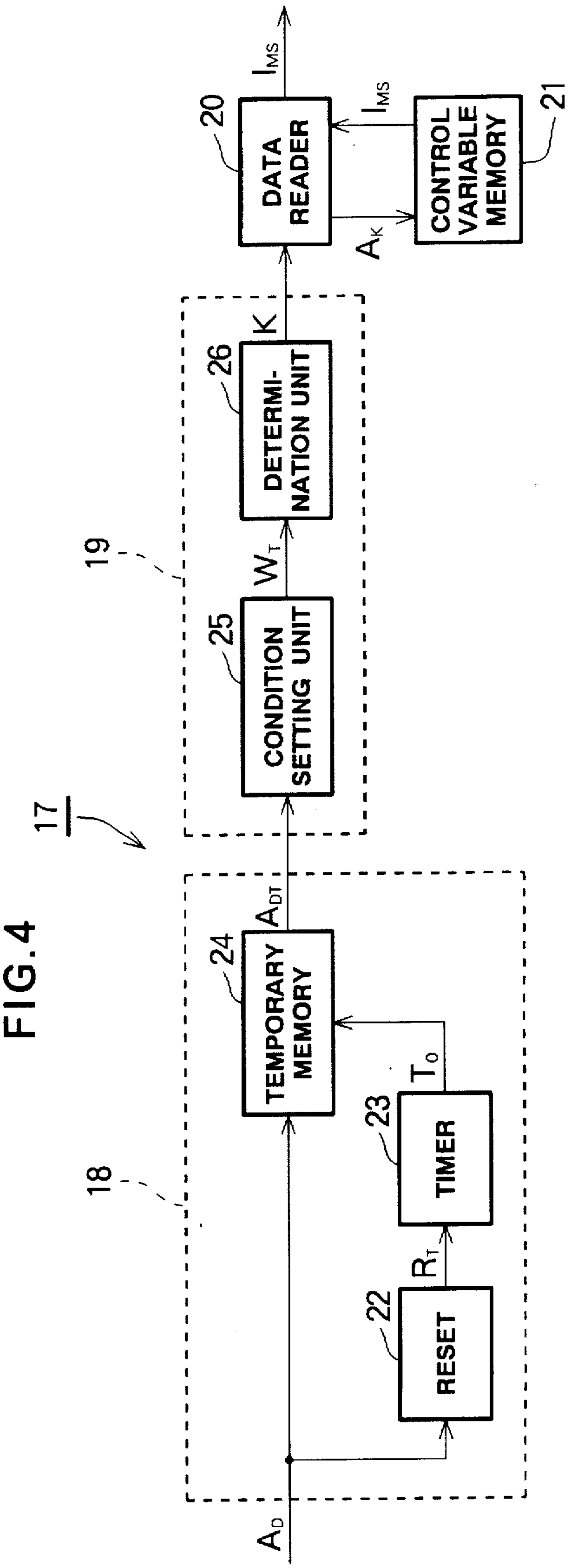
FIG. 4 is a block diagram showing yet another embodiment of the control variable setting unit.

FIG. 4 is a block diagram showing yet another embodiment of the control variable setting unit.

The control variable setting unit 17 of this embodiment comprises a pattern recognition unit 18, an evaluating unit 19, a data reader 20 and a control variable memory 21, stores a level corresponding to the time lapse t of the acceleration signal $A_D$, determines the conditions of an acceleration pattern signal $A_{DT}$ corresponding to the time lapse t, and after estimating an evaluation coefficient K corresponding to the door operating force of the person operating the door based on the determination result, outputs a control variable $I_{MS}$ corresponding to the evaluation coefficient K.

The pattern recognition unit 18 comprises a reset 22, a timer 23 and a temporary memory 24, and where the acceleration signal $A_D$ has been generated, temporarily stores (recognizes) the pattern of the time lapse of the acceleration signal $A_D$ and generates the acceleration pattern $A_{DT}$, then supplies the acceleration pattern signal $A_{DT}$ to the evaluating unit 19.

The reset 22 is formed by a comparison unit such as a standard value 0 comparator for example, and where the acceleration signal $A_D$ is 0 ($A_D$=0), generates an L level reset signal $R_T$, whereas if the acceleration signal $A_D$ exceeds 0 ($A_D$>0), supplies an H level reset signal $R_T$ to the timer 23.

The timer 23 is formed by a clock circuit, commences timing by means of an H level reset signal $R_T$ supplied from the reset 22, and supplies a timer signal $T_0$ to the temporary memory 24 until the reset signal $R_T$ reaches the L level.

The temporary memory 24 is formed by a rewritable memory such as a RAM or the like for example, corresponds to the time lapse t by means of the timer signal $T_0$ supplied from the timer 23 and latches acceleration signals $A_D$, temporarily stores (recognizes) them as acceleration pattern signals $A_{DT}$, and sequentially supplies the acceleration pattern signals $A_{DT}$ to the evaluating unit 19. Also, the temporary memory 24 is reset controlled by the L level reset signal $R_T$ upon the acceleration signal $A_D$ reaching 0, erases the temporarily stored (recognized) acceleration pattern signals $A_{DT}$, then changes to a standby state.

The evaluating unit 19 comprises a condition setting unit 25 and a determination unit 26, judges the acceleration pattern signal $A_{DT}$ supplied from the pattern recognition unit 18 under previously set conditions, and applies predetermined result coefficients etc. to execute a result determination, thereby estimating an evaluation coefficient K corresponding to the door operating force of the person operating the door.

The condition setting unit 25 is formed by a memory such as a ROM or the like, stores weighted coefficient W characteristic data corresponding to previous elapsed time t and a disturbance and weighted coefficient W characteristic data corresponding to an elapsed time t and the operating force of a person operating the door, and upon the acceleration pattern signal $A_{DT}$ being supplied, performs a condition determination based on these weighted coefficient W characteristic data, then supplies a weighted coefficient $W_T$ corresponding to the determination result to the determination unit 26.

The determination unit 26 is formed by a memory such as a ROM or the like, stores evaluation coefficient characteristic data related to the previously weighted coefficient W and, upon the weighted coefficient $W_T$ which is the determination result being supplied from the condition setting unit 25, supplies to the data reader 20 an evaluation coefficient K computed via an evaluation function.

The data reader 20 has an encoding function, converts the evaluation coefficient K to corresponding address data $A_K$, supplies the address data $A_K$ to the control variable memory 21 and reads out target current signal $I_{MS}$ data, and outputs the target current signal $I_{MS}$.

The control variable memory 21 is formed by a memory such as a ROM or the like, stores target current signal $I_{MS}$ data corresponding to the evaluation coefficient K data which is experimentally determined beforehand using the trial and error method, and once the evaluation coefficient K data is supplied, outputs the corresponding target current signal $I_{MS}$ data.

Next, the operation of the control variable setting unit 17 will be explained.

Figure 5:
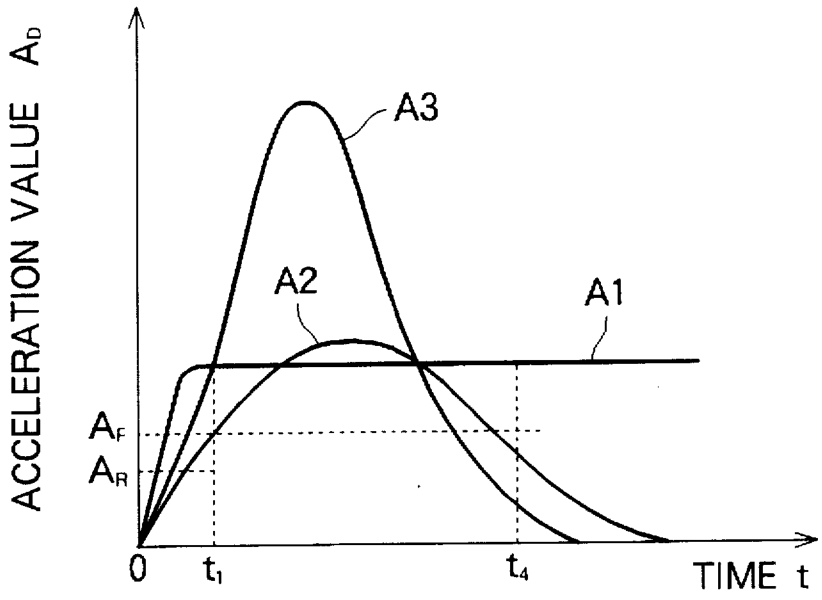
FIG. 5 is a chart of a time lapse t and acceleration values $A_D$.

FIG. 5 shows examples of time lapse t—acceleration value $A_D$ characteristics. Note that FIG. 5 illustrates the conditions for determining a disturbance or the operating force of a person operating the door from the relationship between the time lapse t and the acceleration value $A_D$.

The acceleration value A1 indicates characteristics accompanying disturbances (e.g. gravity), and is a continually fixed value unrelated to the time lapse t.

The acceleration value A2 indicates characteristics generated when a person slowly opens or closes the sliding door, and changes relatively gradually with respect to the time lapse t.

Also, the acceleration value A3 indicates characteristics generated when a person quickly opens or closes the sliding door, and changes rapidly with respect to the time lapse t.

Also in FIG. 5, times $t_1$ and $t_4$ are, respectively, a rise time and fall time of the acceleration value $A_D$ and determine the pattern of the acceleration value $A_D$ generated when a person operates the sliding door.

On the other hand, the acceleration values $A_R$ and $A_F$ are respective standard values at the rise time $t_1$ and fall time $t_4$, and conditions are set so that, where the acceleration value $A_D$ exceeds the acceleration value $A_R$ (standard value) at time $t_1$ or less ($A_D>A_R$) and exceeds the acceleration value $A_F$ (standard value) at time $t_4$ or more ($A_D>A_F$), a disturbance is determined, while where the acceleration value $A_D$ is equal to or less than the acceleration value $A_R$ (standard value) at time $t_1$ or less ($A_D \leqq A_R$) and is equal to or less than the acceleration value $A_F$ (standard value) at time $t_4$ or more ($A_D \leqq A_F$), the operating force of a person operating the door is determined.

Figure 6:
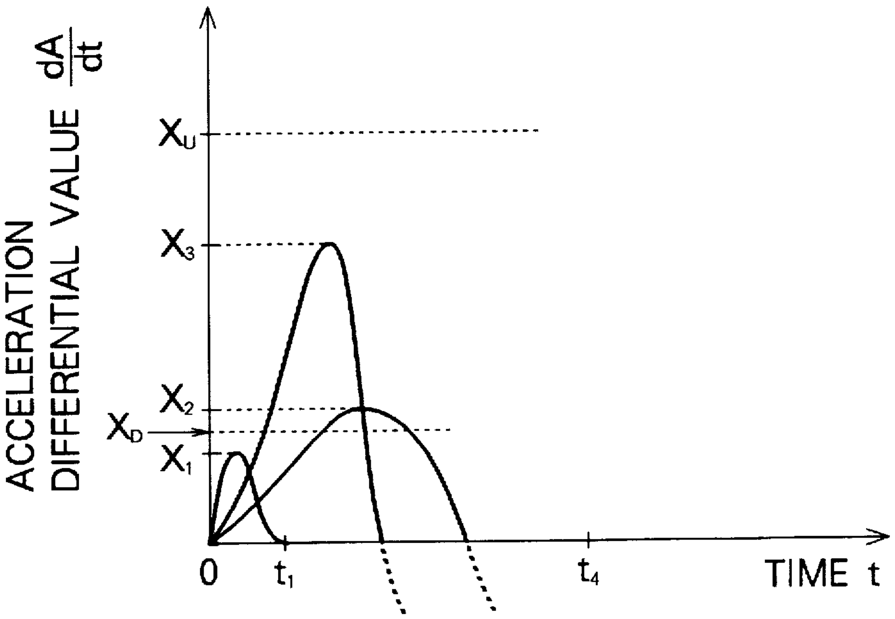
FIG. 6 is a chart of a time lapse t and acceleration differential values (dA/dt)

FIG. 6 shows examples of time lapse t—acceleration differential value (dA/dt) characteristics. Note that FIG. 6 illustrates the conditions for determining a disturbance or the operating force of a person operating the door from a maximum value of the acceleration differential value (dA/dt).

In FIG. 6, a determination upper limit value $X_U$ and a determination lower limit value $X_D$ are set in the acceleration differential value (dA/dt) and depending on what kind of relationship a given differential value of the acceleration value $A_D$ has with respect to the determination upper limit value $X_U$ and the determination lower limit value $X_D$, a disturbance or the operating force of a person operating the door is determined.

For example, conditions are set so that where the maximum value (e.g. $X_1$) of a given acceleration differential value (dA/dt) is lower than the determination lower limit value $X_D$ ($X_1<X_D$), a disturbance is determined, while where the maximum value (e.g. $X_2$ or $X_3$) of a given acceleration differential value (dA/dt) is within the range between the determination lower limit value $X_D$ and the determination upper limit value $X_U$ ($X_D \leqq X_2 \leqq X_U$ or $X_D \leqq X_3 \leqq X_U$), the operating force of a person is determined.

Figure 7A:
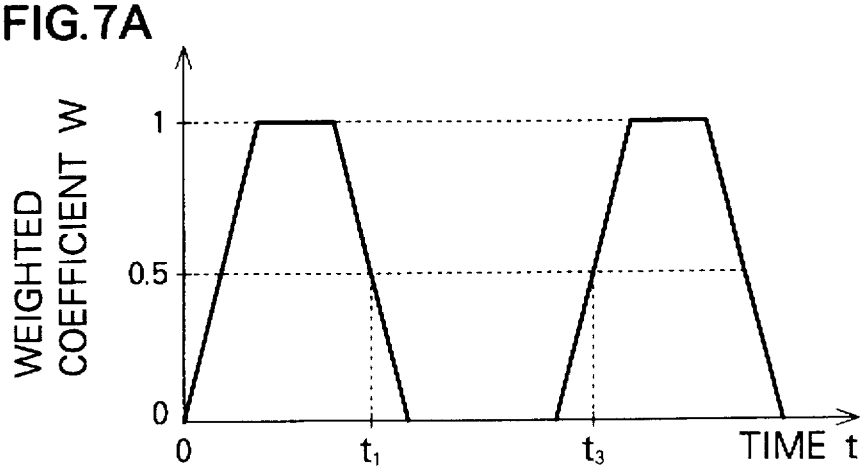
FIGS. 7A, 7B and 7C are charts showing weighted coefficients W of a condition setting unit.
Figure 7B:
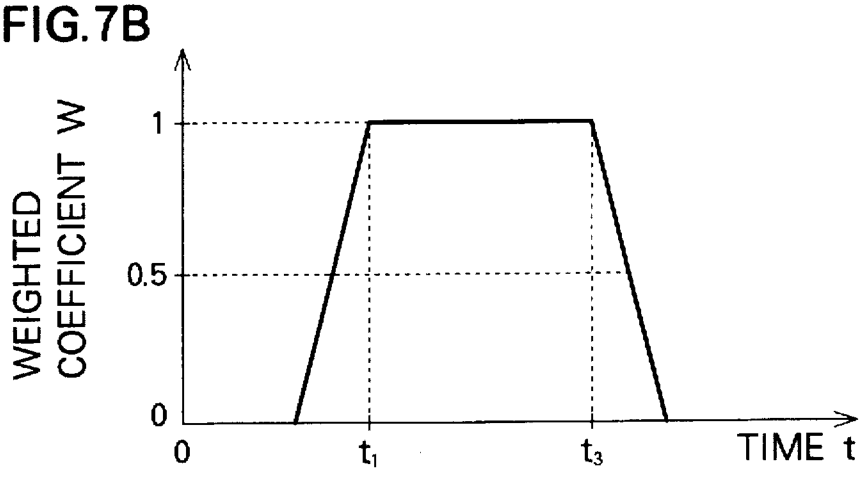
Figure 7C:
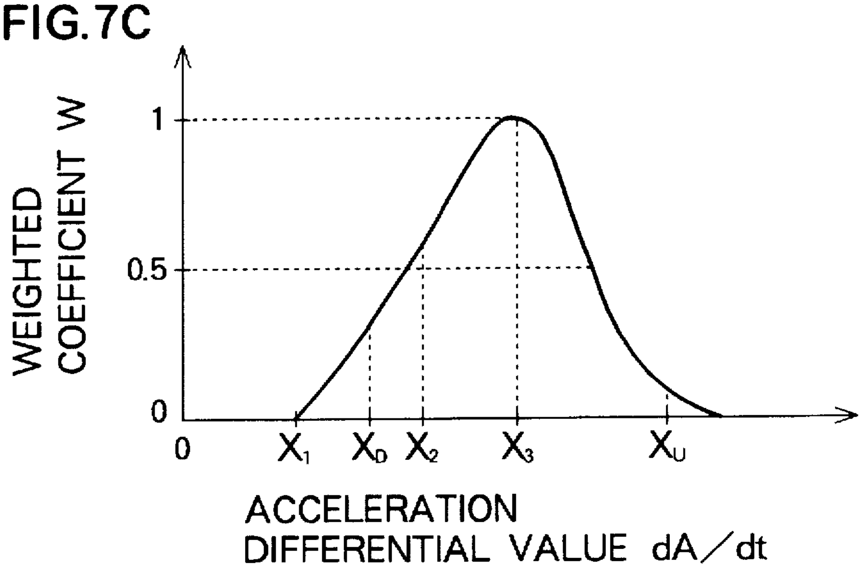

FIG. 7A, 7B and 7C are charts of weighted coefficients W of the condition setting unit 25.

FIG. 7A and FIG. 7B are charts of weighted coefficient W characteristics with respect to a time lapse t. FIG. 7A is the condition for determining a disturbance, and sets a large weighted coefficient W at time $t_1$ and before and time $t_3$ and later. FIG. 7B is the condition for determining the operating force of a person operating the door, and sets a large weighted coefficient W within the range between $t_1$ and $t_3$.

Consequently, where the weighted coefficient W of FIG. 7A is applied with respect to the acceleration value A1 shown in FIG. 5, a disturbance can be significantly determined. Also, where the weighted coefficient W of FIG. 7B is applied with respect to the acceleration values A2 and A3 shown in FIG. 5, the operating force of a person can be significantly determined.

FIG. 7C is a chart of a weighted coefficient W with respect to an acceleration differential value (dA/dt). FIG. 7C is the condition for determining only the operating force of a person, and with respect to an acceleration differential value which is less than the determination lower limit value $X_D$ (e.g. $dA/dt=X_1$), the weighted coefficient W is set to a low value and a disturbance is determined, whereas with respect to an acceleration differential value which is within the range of the determination lower limit value $X_D$ and the determination upper limit value $X_U$ (e.g. $dA/dt=X_3$), the weighted coefficient W is set to a high value and the operating force of a person is significantly determined.

Figure 8A:
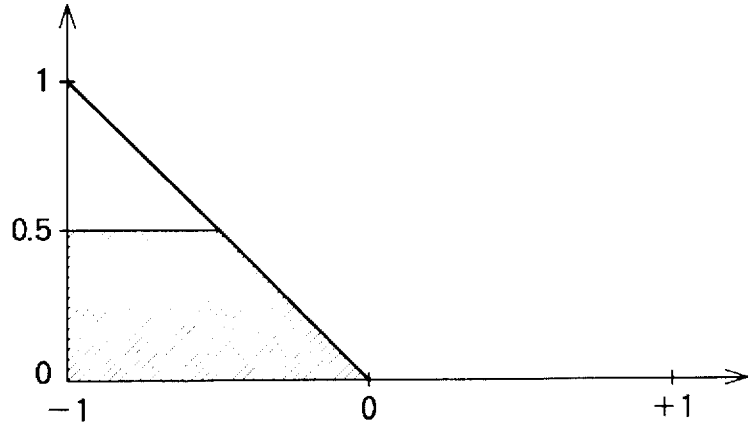
FIGS. 8A, 8B and 8C are charts of evaluation functions of a determination unit.
Figure 8B:
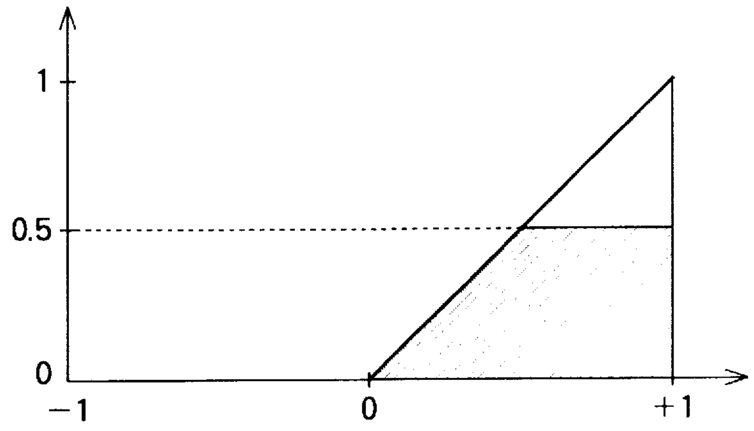
Figure 8C:
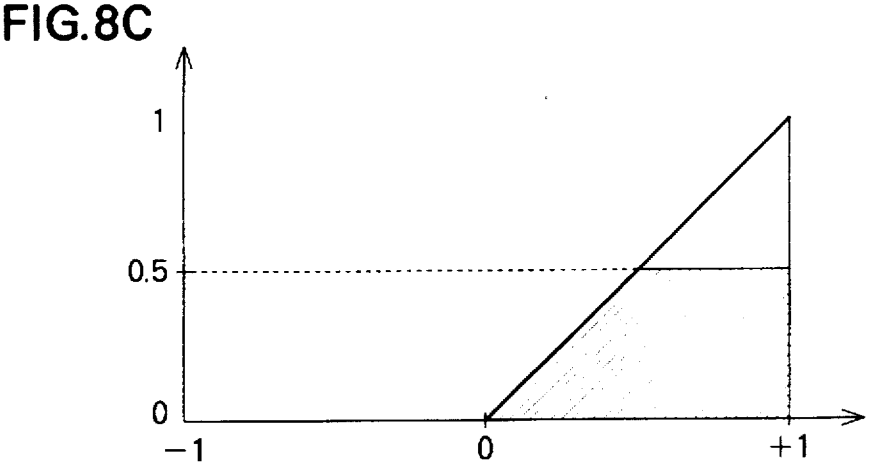

FIGS. 8A, 8B and 8C are charts of evaluation functions of the determination unit 26.

FIG. 8A to FIG. 8C show evaluation functions corresponding respectively to FIG. 7A to FIG. 7C.

The evaluation coefficient K computed by an evaluation function is, for example, set by the average value of the area (hatched section) of FIG. 8A to detect a disturbance, or set by the average value of the area (hatched section) of FIG. 8B or FIG. 8C to detect the operating force of a person.

Note that the areas (hatched sections) of FIG. 8B and FIG. 8C can be combined and set so as to detect the operating force of a person.

In this manner, since the control variable setting unit 17 comprises the pattern recognition unit 18 for recognizing the patterns of acceleration signals $A_D$ and the evaluating unit 19 for evaluating the operating force of a person by means of a pattern from the pattern recognition unit 18 to output a control variable based on the evaluation result, the motor 5 can be driven by a control variable corresponding to the operating force of a person operating the door.

Figure 9:
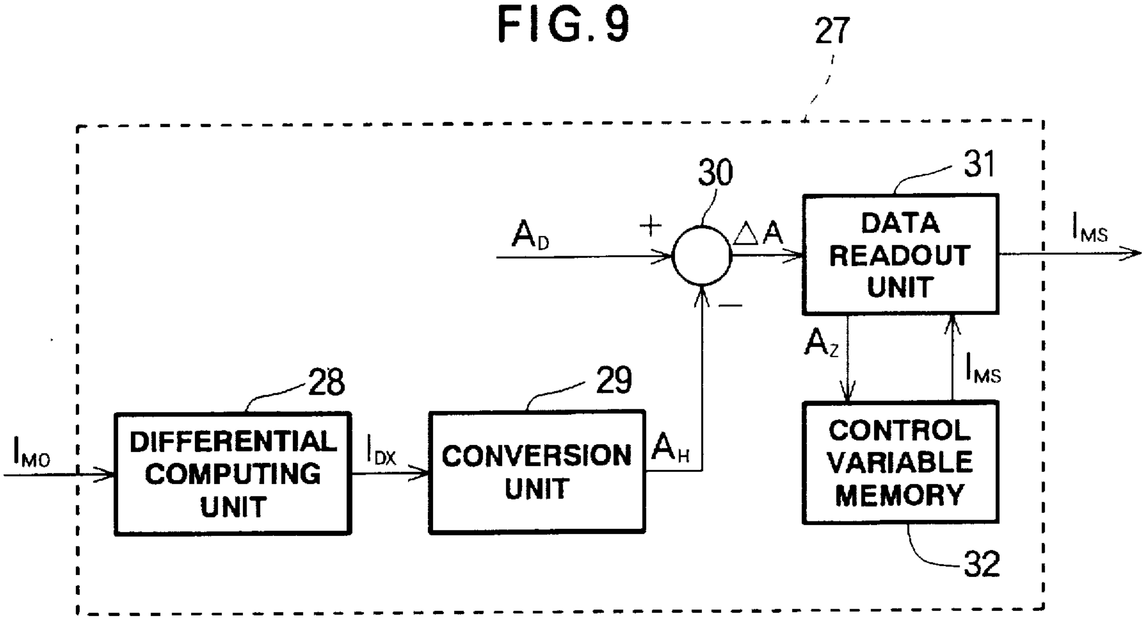
FIG. 9 is a block diagram showing still another embodiment of the control variable setting unit.

FIG. 9 is a block diagram showing still another embodiment of the control variable setting unit.

In FIG. 9, a control variable setting unit 27 has a differential computing unit 28, a conversion unit 29, a subtraction unit 30, a data reader 31 and a control variable memory 32, and by computing the acceleration signal $A_D$ of the sliding door and a deviation $\Delta A$ ($=A_D-A_H$) of a conversion signal $A_H$ which has been converted from a current differential signal $I_{DH}$ of the motor current signal $I_{MO}$ to a variable corresponding to the acceleration value $A_D$, can detect an acceleration deviation signal $\Delta A$ corresponding to the operating force (torque) by which a person operates the sliding door.

The differential computing unit 28 comprises either a differential computing circuit or a software-controlled differential computing function, performs differential computation on a motor current signal $I_{MO}$ supplied from the motor current detector 6 shown in FIG. 1, and supplies a current differential signal $I_{DX}$ to the conversion unit 29.

The conversion unit 29 comprises a conversion coefficient generating unit or the like, multiplies the current differential signal $I_{DX}$ supplied from the differential computing unit 28 by a conversion coefficient, converts it to a conversion signal $A_H$ corresponding to a region which is the same as the acceleration signal $A_D$, and supplies the conversion signal $A_H$ to the subtraction unit 30.

The subtraction unit 30 comprises either a subtraction circuit or a software-controlled subtraction function, computes the acceleration value $A_D$ supplied from the acceleration computing unit 7 shown in FIG. 1 and a deviation $\Delta A$ ($=A_D-A_H$ of the conversion signal $A_H$ supplied from the conversion unit 29, and supplies an acceleration deviation signal $\Delta A$ to the data reader 31.

The conversion signal $A_H$ corresponds to a motor current $I_M$ circulating in the motor 5 and is an amount corresponding to an assisting amount, while the acceleration signal $A_D$ is an amount corresponding to the sum of the operating force (torque) of a person operating the door and the assisting amount of the motor 5, therefore the acceleration deviation signal $\Delta A$ ($=A_D-A_H$) corresponds to the operating force (torque) of a person operating the door.

The data reader 31 has the same structure and operation as the data readout unit 11 shown in FIG. 2, converts the acceleration deviation signal $\Delta A$ ($=A_D-A_H$) to corresponding address data $A_Z$, supplies the address data $A_Z$ to the control variable memory 32 and reads out the target current signal $I_{MS}$ data, then outputs a target current signal $I_{MS}$.

Figure 10:
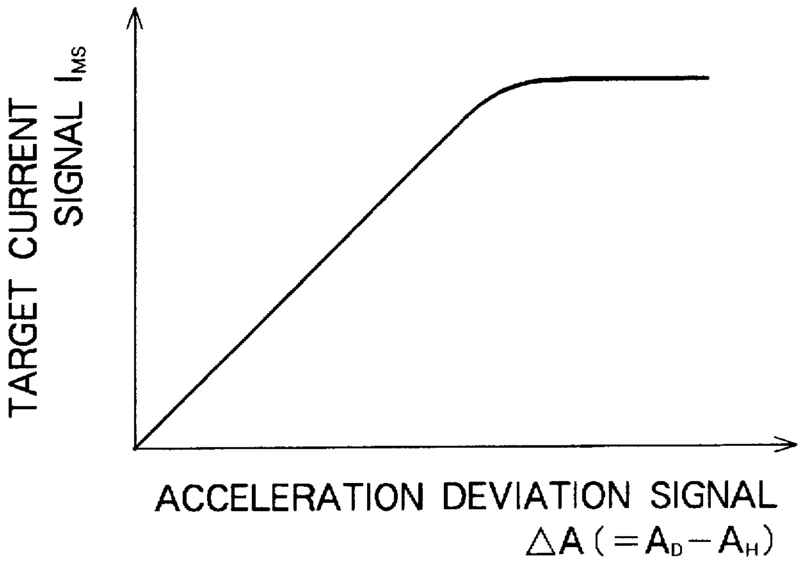
FIG. 10 is a chart of an acceleration deviation signal ΔA ($=A_D-A_H$) and a target current signal $I_{MS}$.

The control variable memory 32 is formed by a memory such as a ROM or the like, stores the acceleration deviation signal $\Delta A$ ($=A_D-A_H$)—target current signal $I_{MS}$ characteristic data shown in FIG. 10, which is experimentally determined beforehand using the trial and error method, and once the address data $A_Z$ corresponding to the acceleration deviation signal $\Delta A$ ($=A_D-A_H$) is supplied, outputs a corresponding target current signal $I_{MS}$.

In this manner, because the control variable setting unit 27 comprises the differential computing unit 28 for differentiating the motor current signal $I_{MO}$ detected by the motor current detector 6 (refer to FIG. 1) and outputting the differentiated current signal $I_{DX}$, the conversion unit 29 for making the differentiated current signal $I_{DX}$ correspond to the acceleration signal $A_D$, the subtraction unit 30 for computing the deviation $\Delta A$ between the acceleration signal $A_D$ and the output signal AH from the conversion unit 29, and the control variable memory 32 for storing the control variable $I_{MS}$ corresponding to the deviation $\Delta A$ from the subtraction unit 30, the acceleration signal $A_D$ can be separated into an assisting force component of the motor 5 (see FIG. 1) and an operating force component of the person operating the door and the motor 5 can be driven by a control variable $I_{MS}$ corresponding to the operating force of the person.

Since, as described above, the control unit of the opening/closing device for an automobile door according to the present invention includes an acceleration computing unit for differentiating a speed signal supplied from a speed sensor to compute an acceleration, and a control variable setting unit for setting a control variable of the motor based on the acceleration signal from the acceleration computing unit, even if a torque sensor for detecting the operating force of a person is omitted, the motor can be driven by generating a control variable corresponding to an acceleration signal which is equivalent to a control variable corresponding to torque, wiring for a slidable section of the sliding door which is required for the provision of a torque sensor is not necessary and wire breakages can therefore be prevented and, given this, improvement of the reliability thereof can be realized by a simple structure.

Since the control variable setting unit comprises a control variable memory for storing control variables corresponding to acceleration signals, the motor can be driven by control variables corresponding to instantaneous values of acceleration and the assisting force for a sliding door can be set by means of a simple structure without a torque sensor.

Also, because the control variable setting unit includes an average value computing unit for computing an average value of predetermined time periods of the acceleration signal and a control variable memory for storing control variables corresponding to average acceleration signals from the average value computing unit, the motor can be driven by control variables of a predetermined pattern corresponding to average values of acceleration and the assisting force for a sliding door can be set by means of a simple structure without a torque sensor.

Further, because the control variable setting unit includes a pattern recognition unit for recognizing patterns in the acceleration signals and an evaluation unit for evaluating the operating force of a person operating the door from the patterns supplied from the pattern recognition unit and outputting a control variable based on the evaluation result, the motor can be driven by control variables corresponding to the operating force of a person operating the door and, given this, the same assisting force control as in a case where a torque sensor is provided can be realized by a simple structure without a torque sensor and the reliability of the device can be improved.

Further still, since the control variable setting unit includes a differential computing unit for differentiating a motor current signal detected by a motor current detecting unit and outputting a differential current signal, a conversion unit for making the differential current signals correspond to acceleration signals, a subtraction unit for computing deviations between acceleration signals and output signals from the conversion unit, and a control variable memory for storing control variables corresponding to deviations from the subtracting unit, the acceleration signals can be separated into motor assisting force components of the motor and operating force components of a person operating the door and the motor can be driven by means of control variables corresponding to the operating force components of a person operating the door, whereby the same assisting force control as in a case where a torque sensor is provided can be realized by a simple structure without a torque sensor and the reliability of the device can be improved.

Thus, the opening/closing device for an automobile door according to the present invention can apply an assisting force for opening and closing a door by means of control variables which are close to the operating force of a person operating the door without detecting the operating force of a person operating the door, by means of a simple structure, and makes highly reliable assisting force control possible.

What is claimed is:

1. An opening/closing device for an automobile door comprising a speed sensor for detecting a moving speed of a door, a motor for applying an opening/closing assisting force to the door, and a control unit for controlling driving of the motor, wherein said control unit includes:

an acceleration computing unit for differentiating a speed signal supplied from said speed sensor to compute an acceleration and output an acceleration signal; and a control variable setting unit for setting a control variable of the motor based on the acceleration signal from the acceleration computing unit.

2. The opening/closing device for an automobile door of claim 1, wherein the control variable setting unit includes a control variable memory for storing a control variable corresponding to said acceleration signal.

3. The opening/closing device for an automobile door of claim 1, wherein the control variable setting unit includes an average value computing unit for computing an average value of a predetermined time period of the acceleration signal, and a control variable memory for storing a control variable corresponding to an average acceleration signal from the average value computing unit.

4. The opening/closing device for an automobile door of claim 1, wherein the control variable setting unit includes a pattern recognition unit for recognizing a pattern in the acceleration signal, and an evaluation unit for evaluating an operating force of a person by means of a pattern from the pattern recognition unit and outputting a control variable based on an evaluation result thereof.

5. The opening/closing device for an automobile door of claim 1, wherein the control variable setting unit includes a differential computing unit for differentiating a motor current signal detected by a motor current detector and outputting a differentiated current signal, a conversion unit for causing the differentiated current signal to conform to the acceleration signal, a subtraction unit for computing a deviation between the acceleration signal and an output signal from the conversion unit, and a control variable memory for storing a control variable corresponding to a deviation from the subtraction unit.

* * * * *